March 18, 1952     T. H. THOMAS ET AL     2,589,643
TRANSMISSION OPERATING MECHANISM Filed June 26, 1948     3 Sheets-Sheet 1

INVENTORS
THOMAS H. THOMAS
EARL R. PRICE
BY RICHARD H. LONG

H. Q. Clayton
ATTORNEY

March 18, 1952     T. H. THOMAS ET AL     2,589,643
TRANSMISSION OPERATING MECHANISM Filed June 26, 1948     3 Sheets-Sheet 2

INVENTORS
THOMAS H. THOMAS
EARL R. PRICE
BY RICHARD H. LONG

H. Q. Clayton
ATTORNEY

INVENTORS
THOMAS H. THOMAS
EARL R. PRICE
BY RICHARD H. LONG

H. Q. Clayton
ATTORNEY

Patented Mar. 18, 1952

2,589,643

UNITED STATES PATENT OFFICE 2,589,643

TRANSMISSION OPERATING MECHANISM

Thomas H. Thomas, Earl R. Price, and Richard H. Long, South Bend, Ind., assignors to Bendix Aviation Corporation, South Bend, Ind., a corporation of Delaware Application June 26, 1948, Serial No. 35,426

1 Claim. (Cl. 74—365)

This invention relates to motor vehicles and more particularly to controlling means for power transmission systems thereof.

More specifically, the invention relates to gear shifting mechanism and is of particular utility when employed in connection with speed changing and direction reversing gearing commonly used in coupling internal combustion engines of automobiles with the driving vehicle wheels or other propelling devices.

One object of the invention is to provide power operated means for operating a two-speed transmission mechanism, preferably mounted on the differential housing of an automotive vehicle or mounted within said housing and constituting a part of the differential and rear axle construction. Such a mechanism serves to supplyment the conventional change speed transmission by providing, in addition to the conventional three-speeds forward and reverse driving ratios, two additional driving ratios between the power plant and the rear wheels. Thus for each of the two settings of the supplemental transmission there are provided, by the standard transmission, four different gear ratios, making eight different ratios in all.

Such a mechanism provides a more efficient power plant, both in climbing hills and on level ground, there being a quiet performance of the motor at high vehicle speeds, and accordingly less wear and tear on the motor parts. On the boulevard or in the country with the car moving at say twenty to sixty miles per hour the two-speed transmission may be operated to select its high ratio; thereupon the car continues at the same speed and the motor speed drops say one-third of its former speed. There is thus provided a mechanism that insures a minimum of noise and vibration, saves wear and tear on moving parts, and in general prolongs the life not only of the motor but of the entire automobile.

According to one desirable construction there is provided a double acting electric motor adapted to be operably connected to the two-speed axle mechanism of heavy duty vehicles, said motor being controlled by a manually operable mechanism preferably mounted in the dashboard of the vehicle.

A further object of our invention is to provide a simple, compact and easily serviced double acting motor unit adapted to operate a change speed transmission mechanism of an automotive vehicle said unit including electrical power means, preferably a plurality of solenoids, and further including yieldable force transmitting means serving to interconnect the power means with the transmission to be operated; and a further object of our invention is to provide a locking mechanism, cooperating with electrical power means and yieldable means of a transmission operating mechanism, and operative to insure an operation of the mechanism until the transmission is established in gear.

The above and other objects and features of the invention will appear more fully hereinafter from a consideration of the following description taken in connection with the accompanying drawings wherein three embodiments of the invention are illustrated by way of example.

Figure 1:
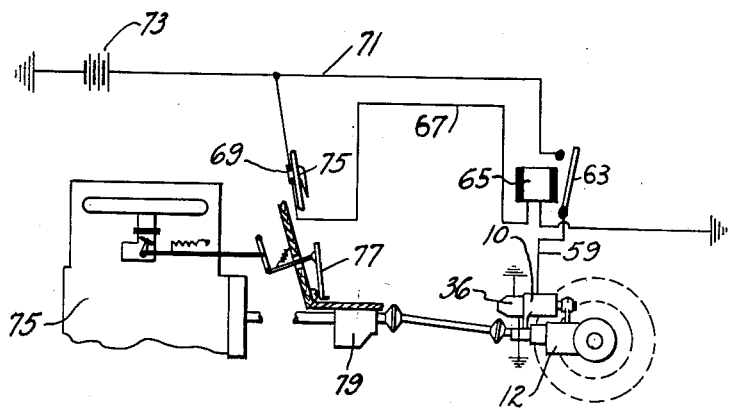
Figure 1 is a diagrammatic view of one embodiment of the transmission operating mechanism constituting our invention.
Figure 2:
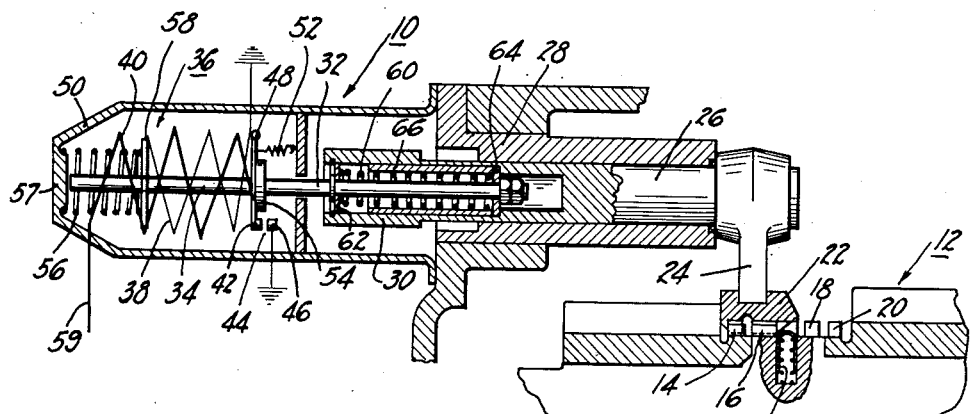
Figure 2 is a sectional view disclosing details of the electric motor unit of the mechanism of Figure 1.

The transmission operating power means constituting our invention is preferably employed to operate a two-speed axle transmission mechanism of an automotive vehicle. Referring to Figures 1 and 2 disclosing one embodiment of our invention a transmission operating power unit 10 is mounted on a casing of a two-speed axle transmission mechanism 12. As disclosed in Figure 2 this transmission mechanism includes low speed gears 14 and 16 and high speed gears 18 and 20, one or the other of said pairs of gears being drivably interconnected with each other by an axially shiftable collar 22 actuated by a shifter fork 24. A spring loaded poppet member 25 may also be included in the transmission mechanism said member contacting the collar 22 and serving to aid the shifter fork 24 in holding the collar in its several operative positions. The gears 16 and 18 preferably include a common body portion and the gear setting of the transmission is established by moving the collar 22 to the right or left, Figure 2, to interconnect the gear members. The shifter fork 24 is connected to a shift rail 26 which is slidably mounted within a casing portion 28 of the power unit 10.

The shift rail 26 is provided with a hollow projection 30 which houses a push rod 32 connected to the two part armature 34 of a solenoid motor 36 constituting the power means of the unit 10. The motor 36 includes a grounded hold-in coil 38 of relatively light wire and a pull-in coil 40 of relatively heavy wire the latter being connected to the movable contact 42 of a breaker switch 44. A fixed contact 46 of the latter switch is grounded as disclosed in Figure 2. The movable contact 42 is preferably pivotally mounted at 48 to a casing 50 of the motor 36; and a return spring 52 serves to bias the contact 42 into engagement with the contact 46 to close the switch 44.

A flange 54 fixedly connected to the armature 34 moves into engagement with the movable contact 42 to open the switch 44 when the motor 36 is energized by the passage of current through the coil 40; for with this operation the armature 34 moves to the left, Figure 2, to establish the transmission in its low gear setting. At this time current is passed through the hold-in coil 38 thereby acting to hold the armature 34 in its low gear position after the pull-in coil 40 is de-energized by the opening of the switch 44. A compression spring 56, interposed between an end wall 57 of the casing 50 and a flange 58 fixed to the armature 34, serves to move the push rod 32 to the right to establish the transmission 12 in its high gear setting after the hold-in coil 38 is de-energized. The flange 58, which is preferably an electrical conductor and connected to the armature 34 by insulation material, not shown, serves as an electrical conductor interconnecting the coils 38 and 40.

Describing the remainder of the electrical means for controlling the coils 38 and 40, a conductor 59, Figure 1, interconnects said coils with a relay 61 including a normally opened switch 63 and a grounded winding 65. As is disclosed in Figure 1 the winding 65 is electrically connected by a conductor 67, with a manually operated selector breaker switch 69 preferably mounted in the dashboard of the vehicle; and the relay switch 63 is electrically connected, by a conductor 71, to a grounded battery 73. The switch 69 is of course also electrically connected to the battery 73. The switch 69 is actuated by a manually operated handle 75 which may be rotated clockwise to close the switch and counterclockwise to open said switch. When the switch 69 is closed the switch 63 is closed to effect an energization of the motor 36 thereby establishing the transmission 12 in its low gear setting; and when the switch 69 is opened the switch 63 is opened to de-energize the motor 36 thereby permitting the spring 56 to expand to establish the transmission 12 in its high gear setting.

Completing the description of the force transmitting means interconnecting the power unit 10 and the transmission, a shifter spring 60 sleeved over the push rod 32 abuts, at its ends, washers 62 and 64 also sleeved over said rod; and a spacer collar 66 sleeved within the projection 30 serves to limit the compression of the spring 60. This spring 60 is preferably of such strength as to be compressed by a force which is less than the force exerted by either the spring 56 or the solenoid motor 36 when energized; and it is also to be noted that the spring 60, together with the parts cooperating therewith, provide a double acting yieldable force transmitting means interconnecting the transmission with the motor.

As to the remainder of the power plant of the vehicle disclosed in Figure 1 this mechanism includes a step type of change speed transmission 79, preferably a three speeds forward and reverse transmission; and said power plant also includes internal combustion engine 75 controlled in large measure by the operation of an accelerator 77.

Describing now the operation of the shifter mechanism disclosed in Figures 1 and 2 it will be assumed that the vehicle is at a standstill with the engine idling and that the switch 69 is closed to establish the transmission 12 in its low gear position. The motor 36 is then energized the armature 34 moving to the left to compress the spring 60 and move the collar 22 to interconnect the gears 14 and 16, all as is disclosed in Figure 2. The driver will then depress the accelerator 77 to get the vehicle under way; and when the desired speed is reached, with say the high speed setting of the transmission 79, then the driver will open the switch 69 and release the accelerator to effect the high gear operation of the power unit 10.

Describing this operation of the unit 10 when the switch 69 is opened motor 36 is de-energized thereby permitting spring 56 to expand to move the rod 32 to the right, Figure 2. By this operation the washer 62 acts to compress the spring 60, the collar 22 remaining in its low gear position so long as the engine is operating to impose a driving load upon said collar and the interconnected gears 14 and 16; then when the driver releases the accelerator to appreciably reduce the torque load upon the collar 22 the spring 60 expands to neutralize the transmission 12. A subsequent synchronization of the high speed gears 18 and 20 results in a movement of the collar 22 to the right, Figure 2, to effect the high gear setting of the transmission. The operation of the transmission is therefore effected in three stages. It is also to be noted that with this high gear operation of the transmission operating motor unit 10 the switch 44 is closed in preparation for a subsequent low gear operation of the said unit.

To subsequently effect a low gear operation of the transmission the driver will close the switch 69 thereby energizing the motor 36. Describing this operation the passage of current through the coil 40 serves to move the armature 34 to the left, Figure 2, the first increment of said movement having no effect on the switch 44; however, after the armature 34 has moved a relatively short distance the stop 54 contacts the contact 42 to open said switch. In this operation the coil 38 remains energized to maintain a load on the rod 32. As to the three stage operation of the yieldable force transmitting means interconnecting the armature 34 and the collar 22, this operation is the same as that described above in establishing the transmission in its high gear setting; accordingly, a description of said operation is not repeated.

There is thus provided by the spring 56 and electrical motor 36 an effective power means cooperating with a yieldable force transmitting means, including spring 60 and rod 32, to provide a compact transmission operating power unit 10.

Figure 3:
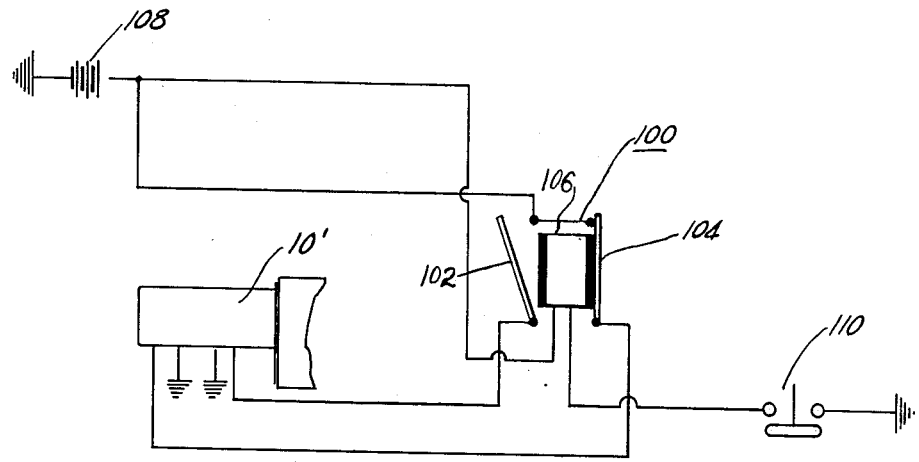
Figure 3 is a diagrammatic view of another embodiment of the transmission operating mechanism constituting our invention.
Figure 4:
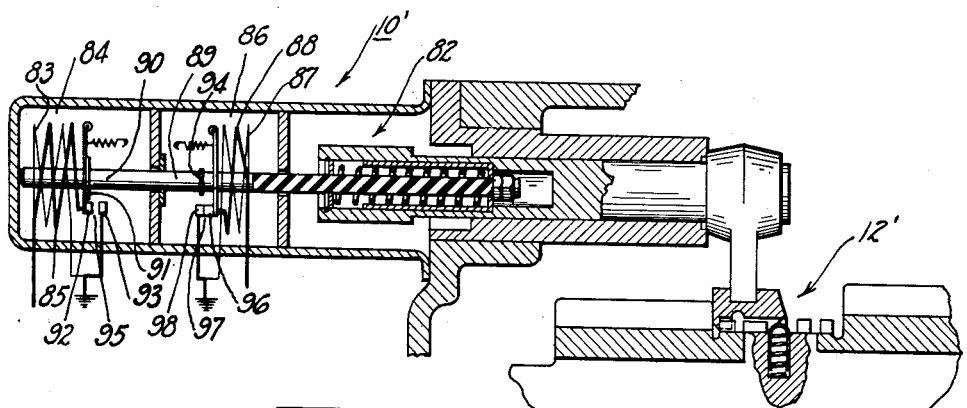
Figure 4 is a sectional view disclosing details of the electric motor unit of the mechanism of Figure 3.

Referring to Figures 3 and 4 there is disclosed therein another embodiment of the transmission operating power means constituting my invention. In this mechanism the two-speed transmission to be operated is a duplicate of the transmission 12 of Figure 1 and is indicated by the reference numeral 12'; and the yieldable force transmitting means interconnecting the transmission 12' with the transmission operating power means also duplicates the corresponding mechanism of Figure 2. This force transmitting means in Figure 4 is indicated by the reference numeral 82. The transmission operating power means of Figures 3 and 4 is indicated as a whole by the reference numeral 10' said power means constituting a power unit similar in operation to the power unit 10 of Figures 1 and 2.

The motor portion of the unit 10' includes two separate electrical solenoid motors 84 and 86, the motor 84 including a hold-in coil 83 and a pull-in coil 85, and the motor 86 including a hold-in coil 87 and a pull-in coil 88. The motor 86 includes an armature 89 which is extended to provide armature 90 for the motor 84. It follows that the armatures 89 and 90 together constitute a two part armature for the motor portion of the unit 10'. A collar 91 fixedly secured to the armature 90 moves into contact with the movable contact 92 to separate the same from a fixed contact 93 of a breaker switch 95; and a collar 94, fixedly secured to the armature 89, is adapted to separate a movable contact 96 of a breaker switch 97 from a fixed contact 98 of said switch. The movable contacts of the switches 95 and 97 are biased into contact with the fixed contacts of said switches by the return springs disclosed in Figure 4. The pull-in coils of both switches are connected to the movable contacts of the switches; and the hold-in coils and fixed contacts of the said switches are grounded, all as is disclosed in Figure 4.

Describing now the electrical means for controlling the electric motors 84 and 86 there is provided a relay 100 comprising a normally closed switch 104 and winding 106. The pull-in and hold-in coils of motor 84 are electrically connected to the relay switch 104. The pull-in and hold-in coils of switch 86 are electrically connected to a relay switch 102; and the switches 102 and 104 and the relay winding 106 are electrically connected to a grounded battery 108, all as is disclosed in Figure 3. The relay winding 106 is also wired to a grounded selector switch 110 which may be conveniently mounted in the dash of the vehicle.

Describing the operation of the motor unit 10' it will be assumed that the vehicle is at a standstill with the engine idling, and that the selector switch 110 is open. The relay switches 102 and 104 will then be opened and closed respectively, all as is disclosed in Figure 3; and with this setting of the controls the motor 84 is energized to move the armatures 90 and 89 to the left to the position disclosed in Figure 4. The switches 95 and 97 are thus opened and closed respectively, and the transmission 12' is established in its low gear setting; and with this operation the hold-in coil 83 of the motor 84 will be operative to maintain the low gear setting of the parts of the mechanism.

The driver will then depress the accelerator to get the vehicle under way and after the desired vehicle speed is reached he will effect the high gear setting of the transmission 12' by closing the selector switch 110. This operation will energize the relay 100 to close the switch 102 and open the switch 104 thereby effecting an energization of the motor 86 and a deenergization of the motor 84. The armature 89 will then be moved to the right, Figure 4, to establish the transmission 12' in its high gear setting the switch 97 being broken after said armature has moved a relatively short distance; however, the hold-in coil 87 remains energized to maintain the parts of the mechanism in their high gear positions. As with the mechanism of Figures 1 and 2 the operation of the accelerator to control the driving torque cooperates with the motor unit 10' in operating the mechanism 12'.

In describing the mechanism of Figures 3 and 4 the operations of the yieldable force transmitting connection 82 and the transmission 12' were not described inasmuch as said operations were included in the description of the mechanism of Figures 1 and 2.

There is thus provided, by the transmission operating mechanism of Figures 3 and 4, a simple and compact double acting three-stage power unit 10' for operating the two speed transmission 12'. The combined effect of the pull-in and hold-in coils of the electric motors 84 and 86 serve to sufficiently load the force transmitting mechanism 82 to effect the desired operation of the transmission, the hold-in coils operating to insure a completion of said operation once initiated.

Figure 5:
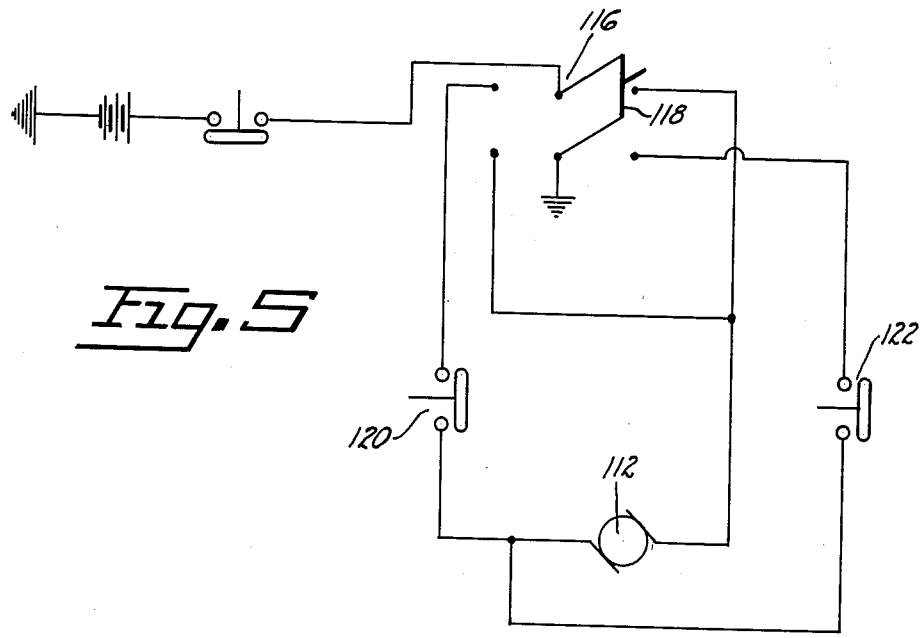
Figure 5 is a view disclosing yet another embodiment of our invention.
Figure 6:
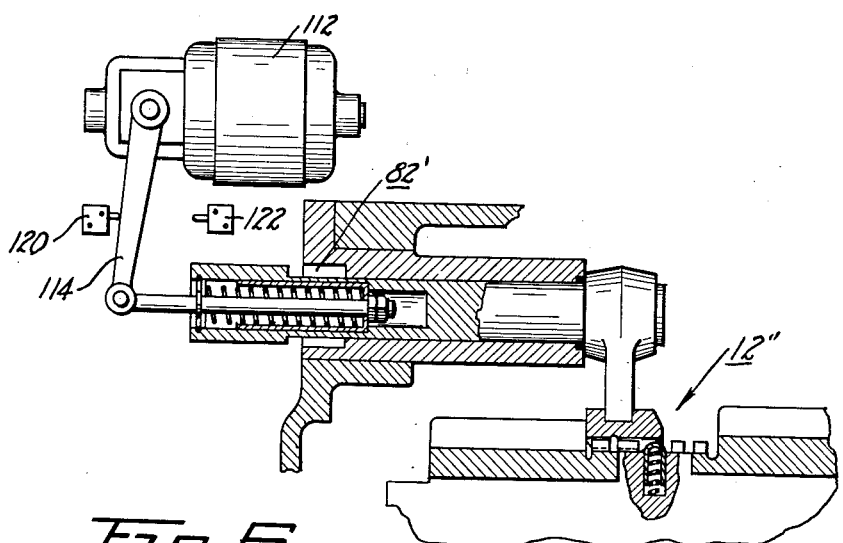
Figure 6 is a view, largely in section, disclosing the reversible electric motor unit of the mechanism of Figure 5 together with details of the yieldable transmission operating force transmitting mechanism actuated by said motor unit.

There is disclosed in Figures 5 and 6 yet another embodiment of our invention; and the two-speed transmission and force transmitting yieldable connection of said embodiment duplicate in construction and operation the corresponding mechanisms of the embodiments disclosed in Figures 1 to 4 inclusive. The yieldable force transmitting connection of Figure 6 is indicated by the reference numeral 82, and the transmission mechanism of this figure is indicated by the reference numeral 12''.

With the mechanism of Figure 6 a reversable electric motor 112 is operably connected with the force transmitting connection 82' by a crank 114 the motor and connection together going to make up a transmission operating power unit generally similar in operation to the above described power units 10 and 10'. The electrical means for controlling the motor 112 is disclosed in Figure 5 and includes a double pole, double throw switch 116 which may be conveniently mounted on the dash of the vehicle. When a movable contact member 118 of the latter switch is rotated in a clockwise direction an electrical circuit is completed through the motor 112 to effect say, the high gear setting of the transmission; and when the contact member 118 is rotated in a counterclockwise direction a circuit through the motor is completed to effect the low gear operation of the transmission. One or the other of breaker switches 120 and 122 are preferably opened by the crank 114 when the power element of the motor 112 has completed its operation of the cocking the spring of the force transmitting connection 82' that is when said power element has moved a certain distance; and a Geneva Loc mechanism built into said motor serves to hold the crank in one or the other of its operative positions that is the positions assumed when the aforementioned spring is cocked. This holding mechanism prevents a reversal, that is hunting movement of the crank 114 under the load of the cocked spring at the time the gears of the transmission are being synchronized.

There is thus provided, by the transmission operating power means of our invention, a simple, compact and easily serviced mechanism for operating a two-speed transmission of an automotive vehicle. The motor portion of the power means of our invention is easily controlled by a dash mounted switch and said motor serves to compress the yieldable means of a force transmitting means to subsequently effect a meshing of the gears of the transmission; and this meshing operation is relatively quiet in view of the relatively low strength of said yieldable means. With the mechanism of our invention the yieldable force transmitting means and the motor means are combined to form a compact two part unit one part of the unit constituting a motor and the other part a yieldable force transmitting means adapted to interconnect the motor with the transmission.

Although only three embodiments of the invention have been illustrated and described, various changes in the form and relative arrangements of the parts may be made to suit requirements.

We claim:

Power means for actuating the shifting fork of a transmission including a transmission operating power unit comprising an electric and spring operated motor having a casing, a partition dividing the casing into two compartments, a plurality of coils within one of the compartments, one of said coils serving as pull-in coil and the other of said coils serving as a hold-in coil, a reciprocable armature actuated by said coils, two spaced apart flange members fixedly mounted on the armature, a motor operating spring member interposed between one end of the latter compartment and one of the flanges, and a grounded motor controlling breaker switch mechanism actuated by one of the flanges and mounted within the latter compartment, said breaker switch being electrically connected to one of said coils, said power unit further including a double acting force transmitting means mounted within the other of the aforementioned compartments and adapted to interconnect the armature and shifting fork.

THOMAS H. THOMAS.
EARL R. PRICE.
RICHARD H. LONG.

REFERENCES CITED

The following references are of record in the file of this patent:

UNITED STATES PATENTS

| Number | Name | Date |
| --- | --- | --- |
| 1,373,099 | Ross | Mar. 29, 1921 |
| 1,720,989 | Ahlm | July 16, 1929 |
| 2,062,104 | Prince | Nov. 24, 1936 |
| 2,220,813 | Derungs | Nov. 5, 1940 |
| 2,231,876 | Beltz | Feb. 18, 1941 |
| 2,241,631 | Claytor | May 13, 1941 |
| 2,257,838 | Claytor | Oct. 7, 1941 |
| 2,266,598 | Hale | Dec. 16, 1941 |
| 2,267,603 | Claytor | Dec. 23, 1941 |
| 2,310,878 | Stephan | Feb. 9, 1943 |
| 2,373,259 | Price | Apr. 10, 1945 |
| 2,402,343 | Price | June 18, 1946 |
| 2,444,953 | Polomski | July 13, 1948 |
| 2,462,779 | Russell | Feb. 22, 1949 |